April 14, 1970     M. E. WALBERG     3,506,073

FOLDING GANG LOCK

Filed April 27, 1967

Inventor
Maynard E. Walberg
By Kenneth McKirdy
Attorney

United States Patent Office 3,506,073
Patented Apr. 14, 1970

3,506,073
FOLDING GANG LOCK
Maynard E. Walberg, Waukesha, Wis., assignor to Allis-Chalmers Manufacturing Company, Milwaukee, Wis.
Filed Apr. 27, 1967, Ser. No. 634,285
Int. Cl. A01b 23/04, 21/08
U.S. Cl. 172—776                                   1 Claim

ABSTRACT OF THE DISCLOSURE

A spring loaded latch with inclined plane for wear compensation and means of rigidly locking a disc harrow gang in a rigid position for field operation, resisting torsional, bending loads and being readily unlockable for quick and easy folding of gangs for narrower transport width or for limiting width for tillage where more weight per blade is desired for good penetration.

---

The present invention relates generally to improvements in implement frames having pivotally attached sections for increasing the width of the working frame and more specifically the present invention relates to disk harrows of the type having oppositely extending gangs of pivotally connected sections in which the outer extension sections can be folded upwardly and over on the main sections to reduce the width of the disk harrow. In the larger wide cut disk harrows, it is desirable to provide some means of reducing the width of the harrow thereby allowing the implement to be transported through gates and on the highway. Also, when hard ground conditions are encountered, the extension gangs may be folded onto the main gang thereby increasing the weight on disks remaining in contact with the ground to obtain additional penetration. Sectionalized disk gangs are well known in the disk harrow art, the conventional arrangement consisting of an extenion gang secured to the main harrow gang by a horizontal pivot whereby the extension can be swung upwardlfy and folded over and supported on the main harrow frame. In the majority of the prior art devices of the above type, the actuation of the locking means for holding the gang extension in their extended positions has been awkward and difficult to accomplish by requiring tools, the use of both hands and the expenditure of considerable time and effort.

It is a feature of the present invention to provide an improved wedge means for interlocking main and extension gangs together to prevent relative movement therebetween when in the operating or extended position, and wherein this wedge locking means is quickly and easily releasable with one hand and without the use of tools when the extension section is to be pivoted from its extended operating position to its folded position.

Another object of this invention is to provide an improved latch means for interlocking main and extension gangs and wherein such means compensates for wear, use and manufacturing tolerance to provide a tightly fitting latch despite continued use.

Figure 1:
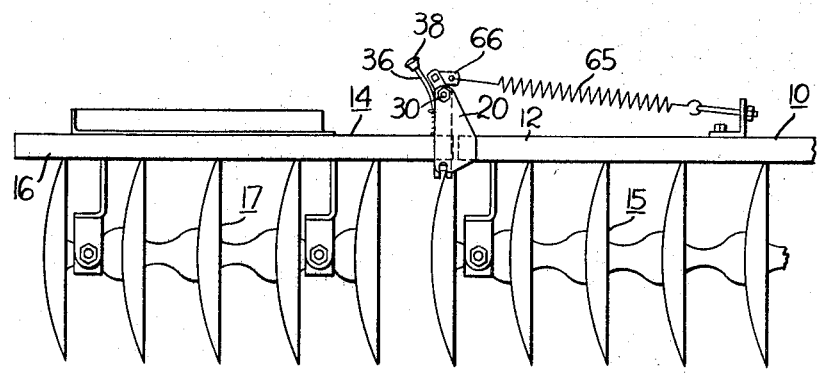
Figure 4:
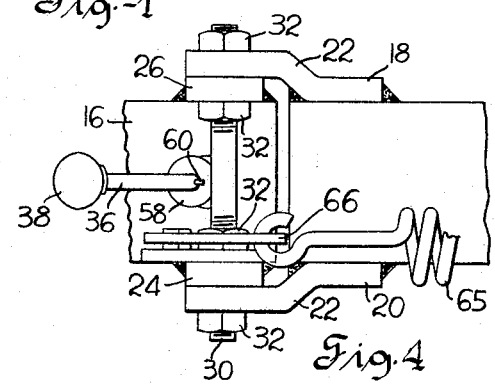
Figure 3:
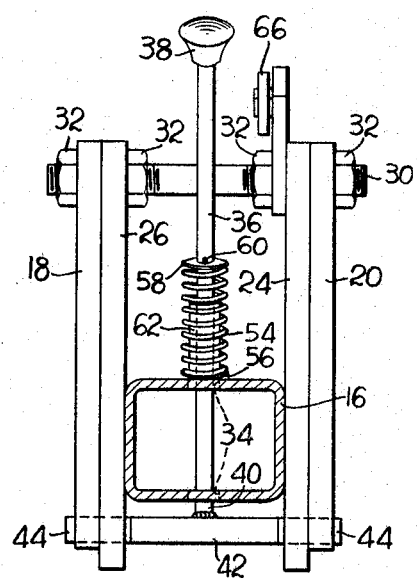
Figure 2:
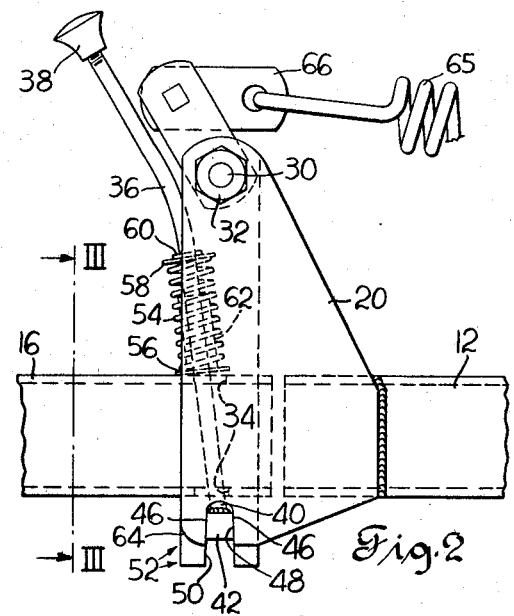

The above recited objects are accomplished by means of parts, combinations of parts, or their equivalents, and mode of operation, as hereinafter set forth and claimed and shown in the accompanying drawing in which:

FIG. 1 is a side elevation of a portion of a disk harrow implement embodying the invention;
FIG. 2 is an enlarged view of a portion of FIG. 1;
FIG. 3 is a section view taken on the line III—III of FIG. 2; and
FIG. 4 is a plan view of the portion shown in FIG. 2.

Referring to the drawing, reference numeral 10 designates the main gang having a tubular frame member 12. Reference numeral 14 refers to the extension gang which also has a rectangular tubular frame member 16. Both frame members 12 and 16 rotatably mount a cylinder of spaced disk members 15 and 17, respectively, in a conventional manner. The inner end of the extension gang 14 has a hinge connection with the main gang 10 which permits vertical swiging movement of the extension gang 14 relative to the main gang 10. The hinge connection includes vertical plates 18 and 20 rigidly secured as by welding to the outer end of the main gang frame member 12. The plates 18 and 20 are offset (see FIG. 4) outwardly, as at 22 to receive therebetween vertical hinge plates 24 and 26 which are rigidly secured, as by welding, to the inner end of the extension gang frame member 16. Both sets of hinge plates 18, 20 and 24, 26 extend upwardly above their respective frame tubes and are provided at their upper ends with transversely aligned openings (not shown) to receive a threaded pivot rod 30. The rod 30 bridges the space between the plate pairs and is provided with nuts 32 on both sides of each adjacent pair of plates to assure a strong hinge structure.

The inner end of the extension gang frame tube 16 is provided with a vertical opening 34 (FIG. 2) which slidably receives a push rod 36. The upper end of the rod 36 is equipped with a plastic knob 38 and the lower end 40 has a transversely extending wedge member 42 rigidly secured thereto, as by welding. The rod 36 is welded to the center of the wedge member 42 and the outer ends 44 of the wedge member are provided with upwardly converging sides 46 (FIG. 2) having a slight angle from the vertical. The upwardly tapered outer ends 44 of the wedge member 42 are received in complementary wedge shaped open ended slots 48 and 50 in the lower portions 52 of plates 18, 20 and 24, 26, respectively.

A compression spring 54 is mounted on the push rod 36 with the lower end thereof equipped with a plate washer 56 which bears against the frame tube 16, and the upper end of the spring is contained by a plate washer 58 and pin 60. The position of the pin 60 is such that a predetermined amount of spring preload urges the rod upwardly at all times. A tube 62 is mounted about the push rod 36 and is assembled within spring 54 with its lower end bearing against the frame tube 16 and its upper end acting as an abutment to limit the amount of spring compression and the downward movement of rod 36.

It is to be noted that vertical plates 24 and 26 on the gang extension 14 extend below the plates 18 and 20 so that slots 50 are correspondingly longer than those in the main frame plates 18 and 20. This permits the rod 36 and associated wedge member 42 to be depressed sufficiently to be released from slot 48 yet still be retained by slots 50 in plates 24 and 26 to guide and keep the wedge member 42 in alignment with the slots 48.

The lower outer edges of the main gang plates 18 and 20 are beveled at 64 (FIG. 2) to form a cam surface to aid in relatching the wedge lock connection. The foldup gang extension 14 is also provided with a counterbalancing spring 65 connected to arm 66 which is operatively attached to plate 24 as is more particularly described in Walberg, U.S. 2,974,738 reference to which may be had if greater details are desired.

The operation of the gang lock when the gang is in its working or extended position is as follows. To fold up gang 14, the operator pushes down on knob 38 with one hand until wedge member 42 has been displaced from slots 48. At this time the balancing spring 65 will cause gang 14 to pivot clockwise above pivot 30 guided by the operator until the folded position of gang 14 is achieved. No tools are required, and the operation of the lock can be quickly and easily accomplished with one hand.

To relatch the lock mechanism, the extension gang 14 is pivoted counterclockwise against the bias of spring 65 until the wedge member 42 is automatically forced downwardly and into slot 48 by the action of cam surface 64 on plates 18 and 20. This relatching movement can readily be accomplished by the operator grasping the distal end of gang 14 and pulling same in a counterclockwise movement.

Various other features and advantages of the invention not specifically enumerated herein will undoubtedly occur to those versed in the art, as likewise will numerous modifications and alterations in the preferred embodiment of the invention illustrated, all of which may be achieved without departing from the spirit and scope of the invention.

The embodiments of the invention in which an exclusive property or privilege is claimed are defined as follows:

1. In a folding implement frame having two sections pivotally connected, an arrangement to releasably lock said sections in a transversely aligned working position, comprising a first pair of hinge members carried by one of said sections, a second pair of hinge members carried by the other of said sections, said first and second hinge members being connected for relative vertical pivotal movement of said sections, said hinge members being provided with wedge-shaped slots which are in longitudinal alignment when said sections are in transversely aligned working position, a longitudinally extending wedge element carried by one of said sections and having a configuration complementary to said wedge-shaped slots, spring means carried by said one section for retaining said wedge element in said slots when said sections are in working position, and each said wedge-shaped slot extends vertically when said sections are in working position.

References Cited

UNITED STATES PATENTS

| | | | |
|---|---|---|---|
| 2,204,718 | 6/1940 | Younie | 37—142 |
| 2,319,464 | 5/1943 | Massa | 37—142 |
| 2,372,120 | 3/1945 | Roberson. | |
| 3,118,507 | 1/1964 | Oehler et al. | 172—568 X |
| 3,123,153 | 3/1964 | Morkoski et al. | |

FOREIGN PATENTS

| | | |
|---|---|---|
| 565,787 | 11/1958 | Canada. |
| 1,090,613 | 10/1960 | Germany. |

ROBERT E. PULFREY, Primary Examiner

A. E. KOPECKI, Assistant Examiner

U.S. Cl. X.R.

16—144; 172—568